May 17, 1960 G. ZANARDO 2,937,237

AUTOMATIC ANSWERING AND RECORDING ELECTRONIC APPARATUS SUITABLE FOR ASSOCIATION WITH CALLING CIRCUITS

Filed March 12, 1957 2 Sheets-Sheet 1

INVENTOR.
Giuseppe Zanardo

BY Karl F. Ross

Agent

May 17, 1960 G. ZANARDO 2,937,237

AUTOMATIC ANSWERING AND RECORDING ELECTRONIC APPARATUS SUITABLE FOR ASSOCIATION WITH CALLING CIRCUITS

Filed March 12, 1957 2 Sheets-Sheet 2

INVENTOR.
Giuseppe Zanardo

BY Karl F. Ross

Agent 2,937,237

AUTOMATIC ANSWERING AND RECORDING ELECTRONIC APPARATUS SUITABLE FOR ASSOCIATION WITH CALLING CIRCUITS

Giuseppe Zanardo, Verona, Italy

Application March 12, 1957, Serial No. 645,427
Claims priority, application Italy March 16, 1956
19 Claims. (Cl. 179—6)

Figures 1, 2:
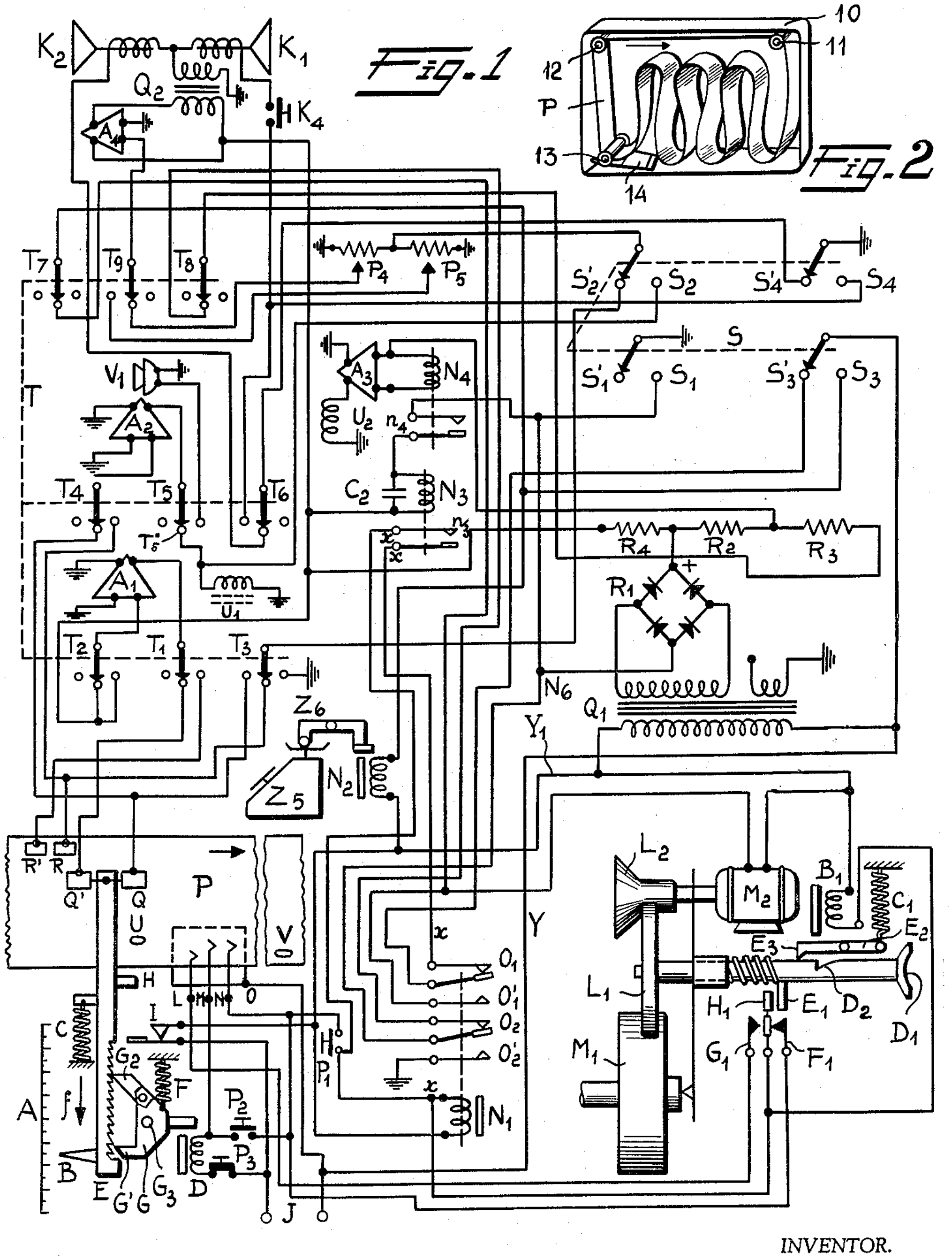

The present invention relates to an electronic apparatus adapted to be associated with telephone devices, doors or the like wherein, in response to a calling signal, a previously magnetically recorded answer is emitted and a message transmitted by the caller is automatically recorded.

Numerous apparatus of this kind have been proposed, some of them allowing only for the transmission of an invariable answer, others also making it possible to record the message of the caller. Some more advanced apparatus comprised selective switching means which permitted either the recording of a fixed answer, the playback of such answer and the recording of the communication, and at least the playback of the recorded message. Such apparatus have heretofore been complicated in operation since a plurality of actuation knobs had to be operated according to complicated sequences. Furthermore the magnetic-tape portion available for recording the fixed answer was generally a small limited portion, while the time gap available for each telephone-call communication to be recorded and the total time for all telephone calls were also limited, thus permitting but a small number of total calls to be recorded.

It is an object of this invention to provide an apparatus which is greatly simplified in its operation, of an overall size reduced to a reasonable minimum and of rational and efficient operation.

Another object of the invention is to provide a magnetizable track portion of selectively variable length for the recording of a predetermined message.

A further object is to provide means to enable the recording of a very large number of calls on a given track. Still another object is to provide means adapted to switch off the apparatus at the end of the total available magnetizable track.

Another object is to provide means for so adjusting a recording apparatus that it will transmit only the predetermined message. Another object is to provide means for switching off only the plate current at the end of a call for switching switch on this current only at the initiation of a new call.

A further object of the invention is to render the apparatus insensitive to the short rings of a telephone calling signal due to erroneous or undesired connections in the telephone network.

Still another object of the invention is to make use of such magnetical recording means as to allow the recorded informations to be played back without waiting for the tape to be rewound, and as to allow the telephone informations to be selected for playback while discarding the uninteresting ones, thus resulting in a high degree of readiness and convenience in the use of the apparatus.

A further object of the invention is to provide means for varying the driving speed of the tape, in order to pass quickly over the idle or silent intervals between recordings. Accordingly, the invention further aims at providing means which, when using the higher speeds, enables the stopping means to be operative not at the end of the track pertinent to each telephone call but after elapse of the fixed-message track portion, since generally it is not desired to re-listen to this known message.

Still a further object is to provide means for switching on the apparatus with a single operation, independently of the position of other actuation means, so as to obtain operation thereof as a loudspeaker for the telephone conversations.

Another object is to provide a receiving apparatus which may be readily set for either conductive or inductive connection with a telephone set.

These and further objects, which will be made more evident as the disclosure proceeds, are realized by an electronic apparatus comprising a magnetic annular recording tape guided by rollers at least one of which is driven by an electrical motor, the circuit of this motor including contacts closed by a relay which is sensitive to the pulses of a calling source such as a telephone calling signal, the apparatus comprising further magnetic recording and reading means cooperating with said tape and energized through circuits including means sensitive to the electromagnetic pulses corresponding to a predetermined message and/or to the informations of the caller, comprising moreover means for canceling the recordings and for selecting the recording and the reading circuits; it also comprises at least one stationary recording and reading head and at least one movable recording and reading head, both stationary and movable heads being operative with respect to a common magnetic tape having a length which is a multiple of the convolution around the guiding portions of the aforementioned rollers, at least two of said rollers stretching at least a portion of said tape, said heads being controlled by circuit-selecting switches which respectively actuate the stationary head to effect a recording, the stationary head and the movable head to effect a playback and a recording respectively, and at least the stationary head to effect a playback, the magnetic tape having means for closing contacts to energize circuits for the transmission of signals causing the tape-driving motor to be stopped and the circuit of said relay sensitive to the calling signal pulses to be disenergized.

Figures 3, 4, 5, 6:
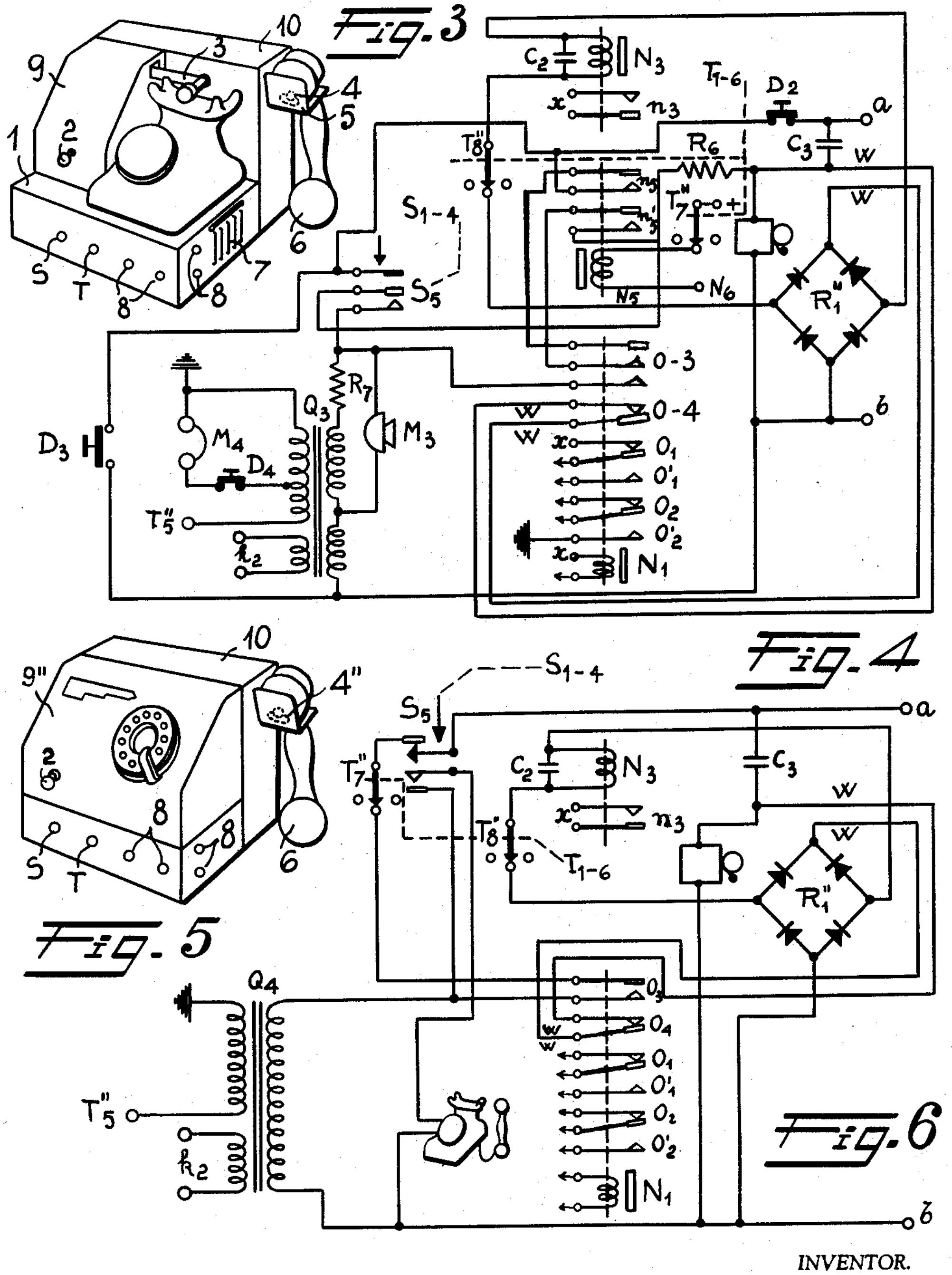

The invention, as far as some preferred embodiments thereof are concerned, will be now described with reference to the accompanying drawing, which is for illustrative purpose only, and wherein:

Fig. 1 is an electrical diagram also showing certain mechanical parts necessary for the operation of the apparatus, Fig. 2 shows, in perspective view, the arrangement of the magnetic tape in its housing, Fig. 3 shows, in perspective view, the outer general aspect of an apparatus including the circuit of Fig. 1, adapted to be connected in a non-interfering manner to a conventional telephone apparatus, Fig. 4 shows only a part of the diagram of the Fig. 1, comprising modifications adapted for associating the circuit with a telephone apparatus, Fig. 5 shows, in perspective view, a novel system comprising the recording apparatus as well as the telephone apparatus according to the diagram of Fig. 4, and Fig. 6 is an alternative embodiment of the diagram of Fig. 1, limited to such parts as have to be modified for direct conductive connection to parts of a conventional telephone apparatus.

In the figures, identical parts have been numbered throughout with the same reference letters or numerals, while equivalent or alternative parts have been indicated by the same reference numerals or letters, double-primed (″).

Referring now more particularly to Figs. 1 to 3, the apparatus comprises an endless tape P arranged freely in a housing or magazine 10 and guided by the rollers 11, 12, 13, of which the roller 11 is coupled to a drum M1 operated from a motor shaft, in order to drive the tape. Roller 13 is associated with a frictional guiding block 14; the tape being led between roller 13 and block 14 is stretched solely along its operative portion. The length of tape P is a multiple of the virtual path around rollers 11, 12, 13. More particularly the length of tape P is selected so that a complete annular track thereon corresponds to the standard duration of each telephone call, obviously depending on the tape speed. For example, the length may be of several yards for individual three-minute calls; whereas the width of the tape may be determined by the number of successive calls which are to be recorded, and the size of the magnetic heads.

On one side of magazine 10 two pairs of magnetic heads are arranged facing the stretched portion of the tape P, one pair Q—Q′ comprising a recording-reading head Q and an erasing head Q′, operating on the same track, and both movably carried by the rack E; the other pair comprising the recording-reading head R and the erasing head R′, both stationary and operating on the same track of the tape. The rack E has a toothed portion with ratchet teeth, associated with a movable catch G2, swingable on a plate G having a stationary tooth G′, and acted upon by a restoring spring F, the rack E being in turn acted upon by a spring C. An index B is secured to the rack E and is movable with respect to a graduated scale A, visible from the exterior of the device, for the selection of the track. The plate G has a magnetically susceptible iron extension attractable by an electromagnet D, which, when energized, causes the plate G to oscillate about a pin G3 so that the movable catch G2 is disengaged from the teeth of rack E, which, due to the action of spring C, is displaced in the direction of arrow *f* by the distance of one tooth, i.e. until the stationary tooth G′ engages the teeth of rack E. Thus the movable heads Q—Q′ are displaced onto an adjacent parallel track. The pitch of the teeth is selected so as to conform to the width of each track and the distance between two adjacent tracks, necessary to avoid interference (e.g. the pitch may be as large as 2 mm).

Obviously the electromagnet D should be energized at the end of the recording stroke established for each individual call. For this purpose, the tape P is provided with a hole U; below the tape a metallic contact plate O is arranged whereas feeler-contacts M and N are positioned above the tape and are adapted to contact plate O through hole U in the tape. More particularly, contact M actuates the circuit of electromagnet D, while contact N closes a circuit transmitting a pulse to a commutation relay N1, as will be seen below.

According to the invention, the tape P is provided with a second hole V offset from hole U, and cooperating with a sweeping feeler-contact L bearing on the tape and connected to the contacts D1 of a pair of stationary contacts G1—F1, either of which is selectively connectable with a movable contact H1; in its rest position the latter engages contact F1 and may be shifted to engage contact G1 by an extension E1 of a push-button D1, actuated from the exterior of the apparatus. A rubber coated wheel L1 is mounted on push-button D1, said wheel engaging drum M1 associated with the driving roller 11, and a conical pulley L2 mounted on the driving shaft of a motor M2. The push-button D1 has a notch D2 engageable by a tooth E3 of an armature E2 so as to maintain the push button in a depressed position corresponding to the high speed engagement between drum M1 and pulley L2. The armature E2 may be attracted by an electromagnet B1 against a restoring spring C1; one terminal of the magnet winding is connected to contact H1, and thus, in the depressed position of push-button D1, to the contact G1 and hence with the contact L. It is obvious that when contact L touches the energized plate O through hole V, the electromagnet B1 will attract the armature E2 releasing the push-button D1, which under the action of its restoring spring, will cause the parts to resume their initial position, corresponding to normal speed.

A push-button switch P3 connected to the winding of the electromagnet D, may bring the rack E out of electromagnetic operation. A push-button switch P2, connected to the winding of electromagnet D, may transmit hand-actuated pulses to the electromagnet, while a push-button switch P1 may transmit a pulse to the commutation relay N1, which is directly connected to one pole of an electrical energy source J.

The operation of the electrical circuit will now be considered in more detail. An alternate current from the source J will pass through a conductor Y, a transformer Q1, and the commutation contacts S3, S′3 of a hand-operated selector switch S having two positions and four sections S1—S′1; S2—S′2; S3—S′3; S4—S′4. In the first, left hand position, the contact S′3 feeds one of the contacts O1—O′1 of a two-section selecting switch controlled by a cam mechanism (not shown) driven by a cyclical relay N1. The cam permits the switch to pass from the cut-off position (as seen in Fig. 1, wherein voltage is applied to contact O1) to the on position, in which the alternating current applied to O1 reaches motor M2 via the intermediate contact of the section T7 of a nine-section selecting switch T (T1, T2, T3, T4, T5, T6, T7, T8, T9) having three positions (left, intermediate and right, as viewed in the drawing) and the winding of a relay N2 designed for the actuation of the lever Z6 controlling the fork of a telephone apparatus Z5.

The return of the transformer Q1 via the conductor Y1 to the energy source J may be cut off by the stroke-end switch I, upon which a projection H of the rack E may act, de-energizing transformer Q1.

In the second, right-hand position S3 of the selector switch S, the alternating current flows through relay N2 actuating the lever Z6, whereby a hand-operated switching of the switch S will convert the apparatus so as to operate as a loudspeaker telephone, without lifting the telephone receiver.

The secondary winding of the transformer Q1 feeds a rectifier R, and the plate current thereof feeds from its positive pole (+) a series of amplifiers A1, A2, A3, A4 as well as a current divider R2—R3, while the negative pole is connected, via the intermediate position of section T8 of the selecting switch T, and the contact O2, to the outlet of the current divider R2—R3 or, in the lower position O′2 of the contacts actuated by relay N1, with the ground.

The current divider R2—R3 feeds, as shown in Fig. 1, a transistor amplifier A3 and a relay N4, closing, if energized, a pair of contacts, cutting off the return towards the negative pole of the winding of auxiliary relay N3 fed over a voltage-dropping resistor R4 by the positive pole of rectifier R1. A delay capacitor C2 is connected in parallel with the winding of relay N3, whereas the contacts *n*3 of relay N3 allow the alternate current to reach via contact O1 the winding of relay N1, the return of which, as well as the return of relay N2, are connected to the source J, over switch I, assuming that conductors *x* from relay N1 are connected with conductors *x* from relay N3, as shown.

U2 is an induction coil designed to transmit pulses from the calling signal to the amplifier A3. U1 is an induction coil provided in the vicinity of the telephone apparatus and responsive to pulses from the conversation-signals reaching the telephone transformer, whereas other signals are collected by a microphone $V_1$, which converts to pulses the voice of the operator of the answering apparatus when recording the prerecorded message. Selection of either coil U1 or microphone $V_1$ is effected by the section T5 of the selector switch T, where the movable contact in the right-hand position corresponds to the recording position. The prerecording collected by microphone $V_1$ is amplified by amplifier A2 and transmitted by section T4 of the selecting switch T, in its right hand position, to the recording head R.

K1 and K2 are two loudspeakers, whereof loudspeaker K2 transmits the prerecorded message and K1 receives the information recorded during the telephone calls. More particularly, the signals transmitted to these loudspeakers are selected by section T6 of selecting switch T and are amplified by amplifier A4, the output of which may pass either through a fixed volume control P5 preadjusted to ensure satisfactory reception of the predetermined message, or, when switching section T9 from its intermediate position to its left position, through a hand-operable volume control P4. The output passes through section T3 of the selecting switch, which in its intermediate position connects amplifier A4 to the fixed answering head R, and in its left-hand position to the movable head Q.

A switch K4 may disconnect the loudspeaker K1, when an amplified call is not desired, particularly when the apparatus is switched to the direct telephone conversation position.

The operation of the apparatus is as follows: First of all the fixed answer is recorded. For this purpose the motor M2 is started by actuating push-button P1, the selecting switch T is shifted to its right-hand position, the answer is read into the microphone $V_1$; the pulses are transmitted to the stationary head R, which records them on a track, the previous recording of which has been erased by the head R′ connected, in the right-hand position of selector switch T to the supersonic oscillator-amplifier A1. Thereafter selecting switch T is shifted to its intermediate position which corresponds to automatic recording. When the telephone bell rings, the pulses are received by coil U2 and amplified by amplifier A3, energizing relay N4, which closes its contacts $n_4$, energizing in turn relay N3, so as to close contacts $n_3$. The energizing circuit of the commutation relay N1 is thus closed, this relay shifts the movable contacts from O1 to O′1 and from O2 to O′2. Thus motor M2 receives current from contact O′1 and starts to move the tape P. Recourse has been made to the expedient of the two relays N3, N4 since it was not possible to delay the relay N4, in view of its low resistance necessary because it is to be connected to the collector of a transistor of amplifier A3. Relay N3 is delayed by a parallel-connected capacitor C2 in order to avoid sensitivity to short rings of the calling signals due to erroneous or unwanted and imperfect contacts in the telephone exchange.

Upon the shifting of the movable contacts associated with contacts O′1 and O′2, the relay N1 cuts off the plate current feeding the transistor of amplifier A3 energizing the amplifiers A1, A2, A4. On the other hand, the winding of relay N1 is disconnected so that accidental pulses are prevented from stopping the apparatus. The winding of relay N2 is fed through contact O′1, said relay actuating the lever Z6 so as to lift the hook of the telephone apparatus.

The tape P now starts running and by means of the head R, the amplifier A4 and the loudspeaker K2 arranged near to the microphone of the telephone apparatus, the fixed answer is read, the answer being successively repeated in the same way at each call. At the same time, coil U1 receives induction pulses from the telephone transformer, which reach head Q via amplifier A2 thus recording the full communication of the caller on the tape. The tape proceeds to the end of its annular path until an electric connection is established between the sweeping contact M and the energized plate O through hole U situated preferably at the end of the path, thus transmitting a pulse to electromagnet D so that the movable heads are shifted onto the adjacent magnetic track of the tape. At the passage of said hole U between plate O and sweeping contact N, a further pulse is transmitted to the commutation relay N1, thus stopping the motor M2 and lowering the telephone hook Z6. The apparatus is now ready for a new call.

In order to listen to recorded communications, the selecting switch T will be shifted to the left-hand position thus cutting off by means of section T8 the plate current feeding the amplifier A3, so that even in case of a new telephone call, no disturbance will arise in the listening circuit, nor will the line be kept busy. By imparting to the rack E a hand-operated displacement (i.e. by actuating index B) in a direction opposite to that of arrow *f*, the movable heads Q, Q′ are brought into their initial position (first track), so that rewinding of the tape is not required in order to listen to the calls recorded. Moreover, if a relistening is required, the index B is shifted until reaching the appropriate track is reached, as indicated on the graduation A, thus selecting this call from among all of the other recordings. Now, by means of the reading head R, the amplifier A4 and the loudspeaker K1, the recorded messages may be listened to. In this case and in the case when the motor must be started by hand, a starting pulse can be transmitted by depressing the push-button P1.

The selector switch S permits a change-over from automatic recording to loudspeaking conversation with the caller independent of the position of the selecting switch T, and without lifting the telephone receiver. It is however preferable to shift the selecting switch T into its left-hand position, so as to prevent the apparatus from being started as the bell rings for a new call.

During playback, first part of each recorded call is the fixed answer, hence the playback and will be followed by a silent end portion the length of which depends upon whether the caller has spoken for a long or a short time. It is therefore desirable to speed the tape through this silent period and the successive fixed answer portion as rapidly as possible. For this purpose, the push button D1 is depressed, so that a high speed is imparted by the intermediate wheel L1 to drum M1 and hence to tape P. As previously explained, upon depression of push-button D1, the contact L becomes operative through hole V; the distance along the tape between hole U and hole V corresponds to the average prerecorded-message period. The driving means is returned to its normal-speed position only after the elapse of the silent and the prerecorded fixed-answer portions.

While during playback of the fixed answer the volume adjuster P5 need not be actuated, during playback of the recorded communication the operator may adjust the volume control P4. The adjustment has no influence on the loudspeakers when the apparatus is in the intermediate switch position. It is thus possible to avoid unclear listening of the fixed answer during automatic operation and the requirement of hand adjustment of the apparatus.

Since the apparatus described receives its operative pulses from the telephone circuit by means of induction, there is no need to violate the telephone equipment, a factor which may be important in view of rules or regulations.

Figs. 4 and 6 show alternative circuits providing for the direct connection of the device to the telephone circuit. These figures show only such parts as are different from those of Fig. 1.

More particularly Fig. 4 relates to an embodiment in which the telephone dial and the microphone of a telephone apparatus are directly associated with the recording and answering apparatus as illustrated in Fig. 5. As shown in Fig. 4, an additional movable contact O–3 of relay N1 is shifted from an open position to a closed one, when the relay N1 is energized, the connection of the circuit corresponding to the lifting of the telephone fork. Contacts O4 are also actuated by relay N1 and open when the relay N1 is energized, thereby opening the circuit leading to the rectifier R″1 which feeds the delayed relay N3. The two leads *w* are connected with the two leads marked $w$ of contact O–4. Section T7 of Fig. 1 is shown to be replaced by section T″7, which serves to energize relay N5 only in the intermediate position of the selecting switch T when this relay N5 is fed by the plate current (point N6, Fig. 1), so that during automatic recording contacts $n5$, $n'5$ are opened in the event of plate-current failure owing, for example, to some defect in the alternating current source. This relay N5 thus avoids occupying the telephone line in cases where the recording answering apparatus is not in operation.

D2 and D3 are contacts actuated by the telephone dials and they operate as in a conventional telephone apparatus. Capacitor C3, resistor R6 and the bell are also arranged as in a conventional apparatus, whereas $a$ and $b$ represent the telephone line.

With reference to Fig. 1, the following components are eliminated: U2, A3, N4, R4, R3 and R2. Upon the arrival of a calling signal, the relay N3 is operated via C3 and R″1. As in Fig. 1, the leads marked by an $x$ at the contacts $n3$ of relay N3 are connected with the similarly marked leads of relay N1, Figs. 1 and 4. Section T8 of selecting switch T (Fig. 1) is replaced by section T″8 (Fig. 4). The microphone transformer Q3 has its primary winding connected as in conventional telephones. M3 is the conventional carbon microphone and M4 is a conventional listening headphone or receiver connected to the secondary winding of transformer Q3, one terminal of which is grounded, whereas the other terminal T″5 is connected to section T5 of Fig. 1 and more particularly to its intermediate contact. Thus coil U1 is eliminated. The fixed message loudspeaker K2 is eliminated and the two terminals thereof are now connected with the two terminals of the auxiliary secondary winding $k2$ of microphone transformer Q3. A supplementary section S5 of selector switch S is actuated together with the other sections S1, S2, S3, S4 of this switch; the contacts of the section S5 are open in the position corresponding to automatic recording and closed in the position of playback of the recorded message. During the loudspeaking conversation with a caller, the telephone receiver is not raised, if selector switch S is shifted, accordingly except when a secret conversation is desired.

Fig. 6 shows another alternative embodiment comprising just such parts which are different from Fig. 1, and which have been modified or replaced in order to allow a conductive connection with the telephone line, by making use of a conventional telephone apparatus. The following components are provided and arranged as in Fig. 4: Bell, C3, R″1, C2, N3, T″5, T″7, T″8, O3, O4, $k2$. The microphone transformer Q4 has a sole primary winding. Microphone M3, and receiver M4 are not used, since use is made of the conventional telephone microphone and receiver.

In view of the detailed description of Fig. 1 and of the disclosure of the components of Figs. 4 and 6, the way of operation of an apparatus with modified circuits as in these Figs. 4 and 6 may be readily understood by persons skilled in the art.

According to the invention a self-contained apparatus is obtained by arranging loudspeaker K1 (Fig. 1) in the front of the set (see Fig. 3) as far as possible from the telephone microphone 6, in order to reduce the Larsen effect. Push-button D1 for actuating the speed variation is indicated by reference numeral 2 and may be arranged in an arbitrary location. Lever Z6 shown at 3 is actuated by relay N2, whereas switch K4 shown at 4 becomes operative when lifting the telephone receiver for carrying on a secret conversation. A carrier 5 is provided for supporting the handset so that the microphone thereof is in the vicinity of the slots 7, where the loudspeaker K2 for the fixed answer is arranged; this answer may be easily picked up by said microphone. S and T show the selector switches, whereas 8 indicates push-buttons of the apparatus. All parts fed by alternating current are conveniently arranged in the housing 9, whereas 10 is the tape magazine behind housing 9. In Fig. 5 the same arrangement has been adopted except that the telephone set itself is formed within a housing 9″, and lever 3 is unnecessary. The loudspeakers K1 and K2 are also eliminated. In 4″ a double switch is shown, one of which corresponds to switch K4 of Fig. 1 and is closed when the microphone 6 is hung up, the second corresponding to switch D4 (Fig. 4) which is closed when the apparatus operates as a telephone loudspeaker.

Between roller 11 and drum M1 a frictional clutch may be arranged, adapted for pedal or hand operation so as to stop and start instantaneously the tape in a manner known per se, for transcribing the recorded messages.

The cross displacement device, comprising the rack E and its associated elements, may be replaced by any gradual displacement mechanism known in the art. Moreover, the movable heads Q, Q′ may operate along a continuous spiral track on the tape and thus any known conventional driving means may be adapted for operative association with the tape P and the movable heads.

Projections or protuberances may replace holes U and V of tape P, in order to actuate contacts M, N, L or equivalent contacts, such projections preferably having a metal coating.

The change-over from the off to the on position, instead of being carried out by relay N1 and its associated contacts, may be obtained by two separate electromagnets, one of which shifts the contacts to the "on" position when receiving a starting pulse, whereas the other returns said contacts to the "off" position, or by any other conventional shifting means.

Although the preferred embodiments of the invention have been herein described, various modifications and substitutions may be effected without departing from the underlying inventive concept. It is not intended, therefore, to be limited to the specific disclosure contained herein, and hereby the right is reserved to all such modifications and substitutions as properly come within the scope of the appended claims.

I claim:

1. An automatic answering and message recording apparatus for a calling circuit, comprising an endless ferromagnetic tape having a width corresponding to at least one prerecorded-message sound track and a plurality of incoming-message sound tracks, said tape being provided with triggering means for releasing operational cycles of the answering apparatus, guiding and transporting means for said tape, including a driven roller and stretching means providing a substantially straight path for a stretched portion of said tape, the length of said tape being a multiple of the total path limited by said guide means, driving means including an electric motor associated with said transporting means, an electric energy source and an energization circuit for feeding said motor from said electric source, a stationary magnetic sound head and a stationary magnetic erase head, scanning said pre-recorded-message track, a movable magnetic sound head and a movable magnetic erase head, scanning selectively one of said incoming-message tracks, all of said magnetic heads being mounted in the proximity of said stretched portion of said tape, a support movable transversely to said tape and carrying said movable magnetic heads, amplifier means for all of said magnetic sound heads, a premagnetization generator for all of said magnetic erase heads, a recording and playback circuit electrically connecting all of said magnetic heads, said amplifier means and said generator, sensing means inductively coupled to said calling circuit, control means acted upon by said sensing means, for introducing operational cycles of the answering apparatus, master switch means actuated by said control means and closing said energization circuit for said motor, and selector means having positions defining operational modes of the answering apparatus and operatively interconnecting said energization circuit, said recording and playback circuit, and said master switching means.

2. An automatic answering and message recording apparatus as described in claim 1, further comprising cross-feed means for displacing said support with said magnetic heads transversely to said tape, and wherein said triggering means comprises auxiliary contact means operated by said tape during its longitudinal travel, said contacts energizing said cross-feed means at least once during one complete running cycle of said endless tape.

3. An apparatus according to claim 2, wherein said cross-feed means comprises a solenoid energized by said auxiliary contact means, an oscillatable armature of said solenoid having a fixed tooth, a movable catch and a spring counteracting the magnetic force of said solenoid, and wherein said support of said heads comprises a toothed rack and a second spring urging said support in a direction towards said cross-feed means, whereby said catch engages said toothed rack in the rest position of said solenoid, and said tooth enters into engagement with said toothed rack during the energization cycle of said solenoid while the engagement of said catch is interrupted, so that upon energization of said solenoid, said support will move crosswise to said tape in a direction away from said stationary magnetic heads, the pitch of the teeth of said rack corresponding to the width of one of said incoming-message sound tracks.

4. An apparatus according to claim 2, wherein said cross-feed means further comprises switch means connected in parallel with said auxiliary contact means, for energizing said means independently from said auxiliary contact means, and second switch means for cutting off the energization of said cross-feed means independently of the triggering by said auxiliary contact means.

5. An apparatus according to claim 1, wherein said support carrying said movable magnetic heads comprises limit switch means, and a stationary portion of the answering apparatus carries a corresponding dog, for interrupting the energization of the apparatus when the last one of said incoming-message tracks has been scanned by said movable heads.

6. An apparatus according to claim 2, wherein said driving means further comprises speed-varying means for said motor, providing for a regular and an accelerated motion imparted to said driven roller, and coupling means for optionally coupling said motor with said speed-varying means.

7. An apparatus according to claim 6, wherein said auxiliary contact means comprises a first and a second contact group arranged at different transversal portions of said tape, the distance between said first and said second contact groups corresponding at least to the length of said prerecorded-message track scanned by said stationary heads, and wherein said speed-varying means comprises a control organ bringing forth in its actuated condition said accelerated motion, spring means urging said control organ into its rest position, switch means operated by said control organ, a second solenoid, engagement means and counter-engagement means arranged respectively on said control organ and on said second solenoid, said engagement and counter-engagement means locking said control organ in its said actuated condition and said second solenoid, when energized, releasing said locking position, said switch means being electrically interconnected with said first and said second contact groups, said first contact group energizing, at least once during one complete running cycle of said tape, said cross-feed means and said master switching means, said second solenoid being energized in the rest position of said switch means by said first contact group and in the switched-over position of said means by said second contact group, after said prerecorded-message track has been scanned by said stationary magnetic head.

8. An apparatus according to claim 1, further comprising an index on said support and a graduated scale on another stationary portion of the answering apparatus, said index traveling along said scale during the displacement of said movable magnetic heads and showing on said scale the particular one of said incoming-message tracks actually scanned by said movable magnetic heads.

9. An apparatus according to claim 1, wherein said sensing means comprises an induction coil coupled with said calling circuit, a sensing relay and an amplifier, interacting to pick up, sense and amplify the calling signal of said calling circuit, said relay energizing said control means at the beginning of an operational cycle of the answering apparatus.

10. An apparatus according to claim 1, wherein said master switching means comprises switch-over contact groups electrically interconnected with said energization circuit of said motor and with said selector means, introducing in the switched-on condition of said master switching means an answering and message-recording cycle of the answering apparatus.

11. An apparatus according to claim 10, further comprising switch means connected in parallel with said triggering means, for optionally energizing said master switching means.

12. An apparatus according to claim 10, wherein said master switching means has a cyclical relay alternately making and breaking said switch-over contact groups upon energization of said relay.

13. An apparatus according to claim 10, wherein said master switching means further comprises switch-over means for electrically connecting into the circuit of the answering apparatus the handset of a telephone apparatus used in conjunction with the answering apparatus.

14. An apparatus according to claim 10, wherein said sensing means comprises rectifier means and said control means comprises a control relay having a capacitor connected in parallel, so as to be energized only by periodical calling signals of said calling circuit, said control relay triggering said master switching means.

15. An apparatus according to claim 14, further comprising cut-off means interrupting the circuit of said rectifier means upon sensing of said calling signal, and cutting in said rectifier means again after having recorded the incoming message.

16. An apparatus according to claim 15, wherein said cut-off means is formed by one of said switch-over contact groups, whereby said rectifier means has cut off its supply circuit during the switched-on cycle of said master switching means.

17. An apparatus according to claim 1, further comprising a sound amplifier and a loudspeaker, and wherein said selector means comprises a plurality of contact groups having at least three operative positions: first, for recording with said stationary magnetic heads said prerecorded message, second, for playback of said prerecorded message to said calling circuit and for subsequently recording with said movable magnetic heads said incoming message from said calling circuit, and third, for listening through said sound amplifier and said loudspeaker said incoming messages recorded on said plurality of incoming-message sound tracks.

18. An apparatus according to claim 17, further comprising commutator means for electrically interconnecting, in its actuated condition, said sound amplifier, said loudspeaker, said selector means and said calling circuit, said commutator means having a plurality of contact groups combining said components into a loudspeaker phone circuit.

19. An apparatus according to claim 1, further comprising a shunting relay kept constantly in energized condition by said energization circuit and having a plurality of contacts cutting off the answering apparatus from said calling circuit in case of a failure of said electric energy source.

No references cited.